United States Patent [19]

Franckx et al.

[11] Patent Number: 4,560,828
[45] Date of Patent: Dec. 24, 1985

[54] TUBULAR ARTICLE FOR BRANCH-OFF SEAL

[75] Inventors: Joris R. I. Franckx, Bonheiden; Luiz N. Mendes, Kessel-Lo; Lodewijk van Noten, Louvain; Thierry Touchais, Brussels, all of Belgium

[73] Assignee: Raychem Corporation, Menlo Park, Calif.

[21] Appl. No.: 493,310

[22] Filed: May 10, 1983

[30] Foreign Application Priority Data

May 11, 1982 [GB] United Kingdom ............... 8213675

[51] Int. Cl.$^4$ ............................................. H02G 15/04
[52] U.S. Cl. ................................. 174/71 R; 24/30.5 S; 24/545; 174/88 R; 174/DIG. 8; 403/273
[58] Field of Search ................ 174/71 R, 72 R, 88 R, 174/84 R, DIG. 8; 24/30.55, 67.9, 530, 545, 488, 339; 403/273, 341

[56] References Cited

U.S. PATENT DOCUMENTS

| | | | |
|---|---|---|---|
| 2,027,962 | 1/1936 | Currie | 174/DIG. 8 |
| 2,142,776 | 1/1939 | Behnke | 24/570 X |
| 3,086,242 | 4/1963 | Cook et al. | |
| 3,379,218 | 4/1968 | Conde | 138/99 |
| 3,455,336 | 7/1969 | Ellis | 138/156 |
| 3,542,077 | 11/1970 | Muchmore | 138/99 |
| 3,770,556 | 11/1973 | Evans et al. | 138/99 X |
| 3,957,382 | 5/1976 | Greuel, Jr. et al. | 403/27 |
| 4,035,534 | 7/1977 | Nyberg | 174/73 R X |
| 4,085,286 | 4/1978 | Horsma et al. | 174/92 |
| 4,194,750 | 3/1980 | Sovish et al. | 174/DIG. 8 X |
| 4,246,687 | 1/1981 | Nolf | 174/DIG. 8 X |
| 4,268,272 | 5/1981 | Taura | 44/3 R |
| 4,298,415 | 11/1981 | Nolf | 174/DIG. 8 X |
| 4,350,842 | 9/1982 | Nolf | |
| 4,380,686 | 4/1983 | Moisson | 174/84 R |
| 4,410,379 | 10/1983 | Franckx | 174/72 C X |
| 4,413,922 | 11/1983 | Nolf | 174/DIG. 8 |
| 4,438,294 | 3/1984 | Meltach et al. | 174/88 R |
| 4,472,222 | 9/1984 | Moisson et al. | 174/92 X |

FOREIGN PATENT DOCUMENTS

| | | |
|---|---|---|
| 3148416A | 12/1981 | Fed. Rep. of Germany . |
| 3012401 | 9/1983 | Fed. Rep. of Germany . |
| 1245119 | 9/1971 | United Kingdom . |
| 1431167 | 4/1976 | United Kingdom ......... 174/DIG. 8 |
| 1594693 | 8/1981 | United Kingdom . |
| 2109170 | 5/1983 | United Kingdom ............... 403/273 |
| 2113134 | 8/1983 | United Kingdom . |

Primary Examiner—A. T. Grimley
Assistant Examiner—Morris H. Nimmo
Attorney, Agent, or Firm—T. Gene Dillahunty; Herbert G. Burkard

[57] ABSTRACT

A branch-off between elongate substrates, such as cables, is enclosed by a recoverable sleeve. A clip is positioned over an edge portion of the conduits for the substrates. The clip comprises a tubular body having circumferentially spaced apart slits, within which the end portions of the sleeve is received.

12 Claims, 12 Drawing Figures

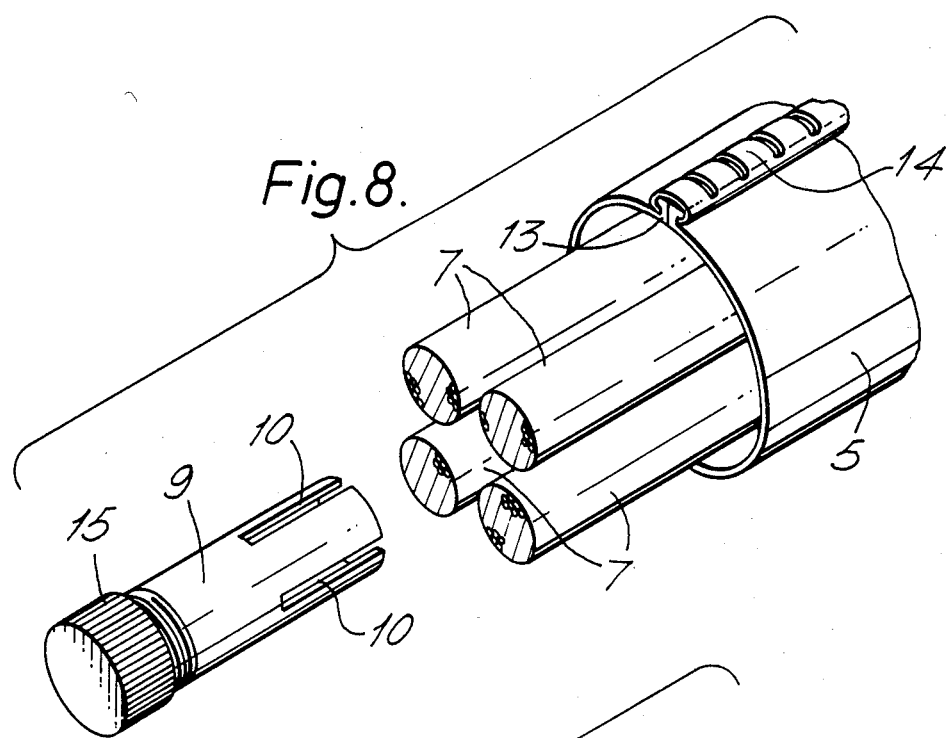
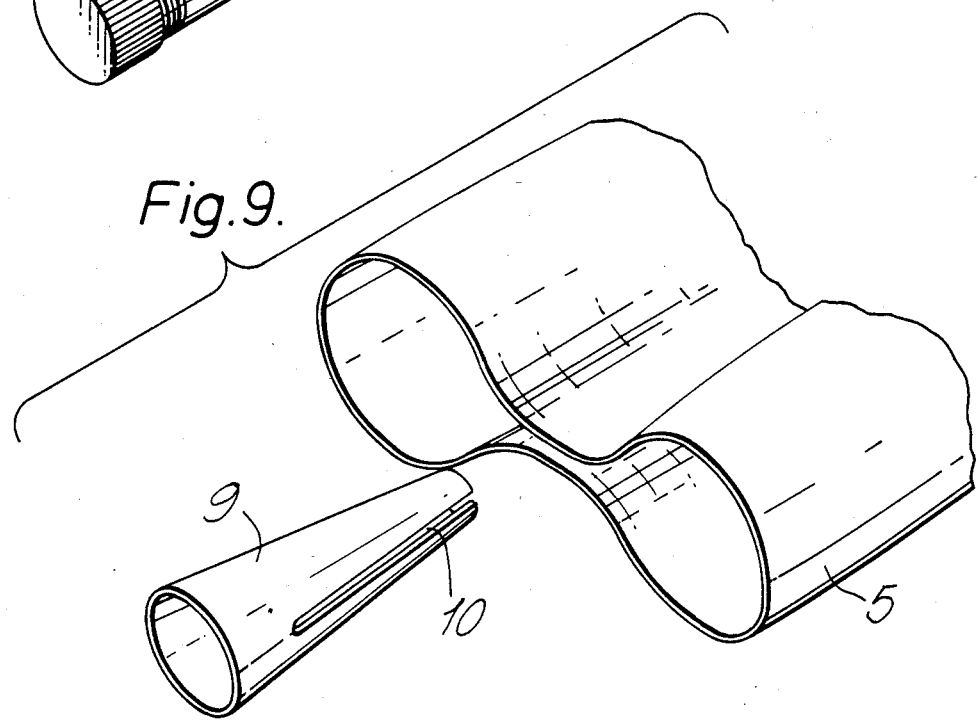

TUBULAR ARTICLE FOR BRANCH-OFF SEAL

DESCRIPTION

This invention relates to the insulation and protection of branch-offs between elongate substrates, particularly telecommunications cables and other supply lines.

Such insulation and protection is conveniently provided by the use of recoverable articles which can be installed around the substrate to be protected and then recovered. As a result close tolerances are not required between the article and the substrate, making installation considerably simpler. The means by which recoverability is brought about will depend upon the way in which the article was made but preferred agencies are heat, solvents and the mechanical removal of a hold-out member. Of these heat recovery is the most used at present.

Heat-recoverable articles, especially heat-shrinkable articles usually recover on heating towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372. These and other specifications referred to are incorporated herein by reference. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form, but in other applications, a preformed dimensionally heat stable article is deformed to a dimensionally heat unstable form in a separate stage.

In other articles, as described, for example, in British Pat. No. 1,440,524 equivalent to U.S. Pat. No. 4,035,534, an elastomeric member such as an outer tubular member is held in a stretched state by a second member, such as an inner tubular member, which, upon heating, weakens and thus allows the elastomeric member to recover.

Heat-shrinkable sleeves find many applications, especially in the connection and termination of wire, cables and pipes. However, there are other applications where it is desirable to provide a connecting, insulating or protective heat-recoverable member for elongate objects such as cables and pipes where the ends are not accessible or, if they are accessible, where it is undesirable to disconnect or otherwise displace them. For such applications so-called "wrap-around" sleeves have been developed. Basically these are heat-recoverable sheets which can be wrapped round the substrate to form a generally tubular shape and which, in general, are provided with fastening means for holding them in the wrapped-up configuration during recovery. Typically such fastening means are mechanical in nature and comprise, for example, rigid clamps, pins or channel members which co-operate with suitably shaped moulded or extruded protruberances adjacent to the overlapping edges of the heat-recoverable sheet. Various types of fastening means are described, for example, in U.S. Pat. Nos. 3,379,218 and British Pat. Nos. 1,155,470; 1,211,988 and 1,346,479 equivalent to U.S. Pat. Nos. 3,455,336, 3,542,077, and 3,770,556, respectively. In other applications, however, the sheet may be held in the wrapped-up configuration during recovery by means of an adhesive which may, in some cases, be applied on site.

Heat-recoverable sleeves and wrap-around sleeves have been successfully employed in many fields of application. However, problems may arise when two or more substrates such as supply lines, for example cables or pipes, have to be sealed at one position. This problem, which is known as "branch-off", may occur, for example, at the outlet of a heat-recoverable part. Branch-off simply means that two or more substrates leave the same enclosure, and it is not necessary that the substrates be joined together within the enclosure. Amongst areas in which this problem is typically encountered there may especially be mentioned the outlets of the splice cases described and claimed in British Pat. No. 1,431,167 equivalent to U.S. Pat. No. 4,142,592, the feed-through devices described and claimed in British Pat. No. 1,245,119 and the duct seal devices described and claimed in British Pat. No. 1,594,937 equivalent to U.S. Pat. No. 4,194,750.

One effective solution for tubular sleeves has been to use moulded heat-shrinkable parts provided with preformed outlets for the individual supply lines. However, in general such moulded parts have to be made to suit a specific application. Their versatility has been improved by the use of end caps which seal outlets which are not needed in a specific operation, as described and claimed in German Offenlegungsschrift No. 2,748,383 equivalent to British Pat. No. 1,594,693, but they are nonetheless expensive and thus their use becomes economically infeasible in many routine applications.

Another, less expensive, solution which has frequently been employed is to use mastic tape to seal the gap between the supply lines so that, on recovery, a proper encapsulation is formed at the end of the heat-recoverable part. However, the use of such tape requires skill on the part of the installer and the method is not applicable to large parts. In addition, the mastic may degrade the overall performance of products which are provided with an inner lining or coating of a hot-melt adhesive.

A recoverable splice case which can accommodate a plurality of cables of various sizes is disclosed in U.K. Pat. No. 1529355 equivalent to U.S. Pat. No. 4,085,286. In one embodiment, this splice case comprises a base and a covering of a potentially recoverable material. This material is fixed to the base between the positions where the ingoing cables will be, and the material between these fixed positions is expanded to sizes sufficient to allow insertion of the cables. When the expanded material is later recovered the cables will be sealed at their entry into the splice case. The material can be fixed to the base by a rigid dimensionally stable member such as a two pronged clip.

U.K. Patent Specification No. 2019120 equivalent to U.S. Pat. No. 4,298,415 provides a further solution to the problem; it does this by means of a clip which is used to form the individual outlets at the end of a recoverable sleeve. The method claimed in this earlier specification comprises the following steps:

(a) positioning a clip having at least two elongate legs over the outer surface of the heat-shrinkable sleeve at the end thereof so as to form at least two terminal conduits.

(b) positioning the substrates within the conduits; and (c) applying heat so as to effect shrinkage and to form the desired seal.

In its simplest form the clip disclosed in Specification No. 2019120 is U-shaped and of solid material, the two legs simply being slid over the outer surfaces of the recoverable sleeve at a portion between the substrates. More elaborate clips are also disclosed; for example the clip can have three legs, the central one passing into the recoverable sleeve and being coated with a hot-melt adhesive for improved sealing.

A development of such a clip is disclosed in U.K. Pat. No. 1604984 equivalent to U.S. Pat. No. 4,246,687 where provision is made to accommodate slack in a sleeve where the substrates it encloses are far apart and cannot be moved closer. An example of this is lead boxes for telephone cable junctions where the separation between the diverging cables may be 30 mm or more. Where such boxes are enclosed by recoverable sleeves for environmental protection it is difficult to close the gap between the diverging cables and the sleeve. U.K. Patent No. 1604984 solves this problem by using a fork member (rather than a simple clip) through the prongs of which are threaded the two thicknesses of an end portion of the sleeve. The two thicknesses of the sleeve are thus held together over an appreciable extent of its circumference.

We have now designed a specific clip of the type disclosed and claimed in U.K. Specification Nos. 2019120 equivalent to U.S. Pat. No. 4,298,415 and 1604984, which is simple and easy to produce and which combines the ease of installation of the simple clip with the ability of the fork member to close gaps between widely spaced substrates.

The invention therefore provides an enclosure for a branch-off between at least two elongate substrates, which comprises:

a recoverable sleeve which can surround the branch-off; and a clip comprising a tubular body having circumferentially spaced apart at least first and second longitudinal slits or pairs of slits, such that within each slit or pair of slits two thicknesses of an end portion the sleeve can be received in close fitting engagement to form at least two conduits in the end portion of the sleeve.

In general, where a single slit is provided both thicknesses of sleeve will pass through it, and where a pair of slits is provided, one thickness will pass through one slit of the pair, and an opposing thickness will pass through the other slit of the pair. The clip may, of course, employ a single slit and a pair of slits.

Where a branch-off between two substrates only is to be enclosed, the clip will generally have two slits or pairs of slits. The two thicknesses of the sleeve will pass into the tubular body through (say) one slit and emerge through the other slit, thereby being held together within the body. As the sleeve is recovered, it will tighten within the body and this tightening can be used to effect an improved seal between the two thicknesses of sleeve. This can be done by modifying the clip in the following way: the tubular body is deformed by denting inwardly its circumferential surface to form a re-entrant portion which projects through a line joining opposing slits or opposing pairs of slits. As a result the two thicknesses of sleeve do not follow a straight path between the two slits, an effect of which is that recovery of the sleeve causes the two thicknesses to be forced against one another. In such an arrangement no additional adhesive need be supplied, an adhesive coating on the internal surface of the sleeve generally being sufficient. With the simple known clip, however, it is often desirable to provide a central leg coated with adhesive. The adhesive on the sleeve is preferably a heat-activatable adhesive, such as a hot-melt adhesive or a reactive system such as an epoxy based adhesive.

The re-entrant portion also improves heat flow to the crutch region of the branch-off during heat recovery. Where considerable heating is required for recovery or for activating a heat activatable adhesive or sealant it may be found desirable to provide several re-entrant portions or to perforate the tubular body to improve heat flow.

In enclosures for branch-offs between three or more substrates there may be a problem in providing sufficient adhesive to form a proper seal at the end of the sleeve. Taking as an example a particular branch-off of three substrates, the problem can be explained as follows. The tubular body will have three slits (or pairs of slits), and the three substrates will be arranged at the corners of an equilateral triangle with a slit adjacent each substrate. The recoverable sleeve emerges from within the tubular body through a first slit (or through one of a pair of slits), passes around a first substrate and then re-enters the body through the same first slit (or through the other of a pair of slits). The sleeve then emerges through a second slit, passes around a second substrate, and so on. This arrangement leaves a triangular shaped void between the thicknesses of the sleeve within the tubular body which could provide access to the inside of the enclosure if means were not provided to seal it. The void can be sealed by providing re-entrant portions as mentioned above, by filling the inside of the tubular body with an adhesive or by using a tubular body which is blind at one end.

If desired, this void can be used to provide access to the enclosure, for pressure measurement or for pressurisation etc., in which case the tubular body may incorporate a valve or be reopenably sealable by means for example of a screw-threaded cap.

The size of the tubular body of the clip will clearly be chosen according to the separation between the substrates, and the number and positioning of the slits chosen according to the number and positioning of the substrates, but there is a further factor that should be considered. The shape of the body can be chosen to give yet further advantages to the present design. In general the body will have a simple right cylindrical shape, but it can be shaped to conform to the substrates or to allow the same clip to fit various branch-off sizes, thus reducing inventories. Two or more clips could be used side-by-side where the separation of the substrates is very large.

If opposite sides of the tubular body are made concave the clip will fit snugly between the substrates, thus producing a neater, more rugged, and perhaps better sealed enclosure. Where two or more clips are to be used side-by-side, adjacent surfaces could be made to interlock.

The clip can be made to fit a range of sizes of enclosures by making the tubular body taper or by providing converging pairs of slits, in each case the sleeve is threaded through the slits and the clip pushed into the branch-off just as far as is necessary to take up any slack in the sleeve. A taper in the body or convergence between the slits may give the clip a tendency to milk-off during recovery of the sleeve, but if necessary this can be prevented by, for example, giving the slits what has become known as an "anti-milk-off profile". Such a profile means a variation in the size of the slit so that the sleeve becomes trapped in the slit as the sleeve thickens during recovery.

If desired a clip with a tapered body or converging pairs of slits could be cut to the desired length to fit the particular branch-off encountered on site. Each slit could also taper, and the clip pushed home far enough to provide a tight closure of the sleeve adjacent each substrate, although this may not be desirable where some long range movement of the sleeve is likely on recovery.

Where the enclosure is to be used around a telecommunications cable splice or similar substrate, it may be desirable to use a support liner between the splice and the recoverable sleeve. The function of the liner is to prevent damage to the splice by providing mechanical protection and water and heat barriers, and to give the final enclosure a pleasing shape. Such liners can ensure a gentle contour to the splice so that the transition between cable and splice bundle is neither too great nor too sharp. Liners can be made for example from metal half shells, from cardboard laminates and from plastics materials. These types of liners are disclosed respectively in U.K. patent specifications Nos. 1431167, 2059873 and 2069773 equivalent to U.S. Pat. Nos. 4,142,592, 4,380,686 and 4,472,222, respectively.

The invention is now further illustrated, by way of example, with reference to the accompanying drawings, in which:

FIG. 8 shows a modified new clip having a blind end;

FIGS. 9 and 10 show ways of making the new clip adaptable to a variety of substrate spacings;

Figure 1:
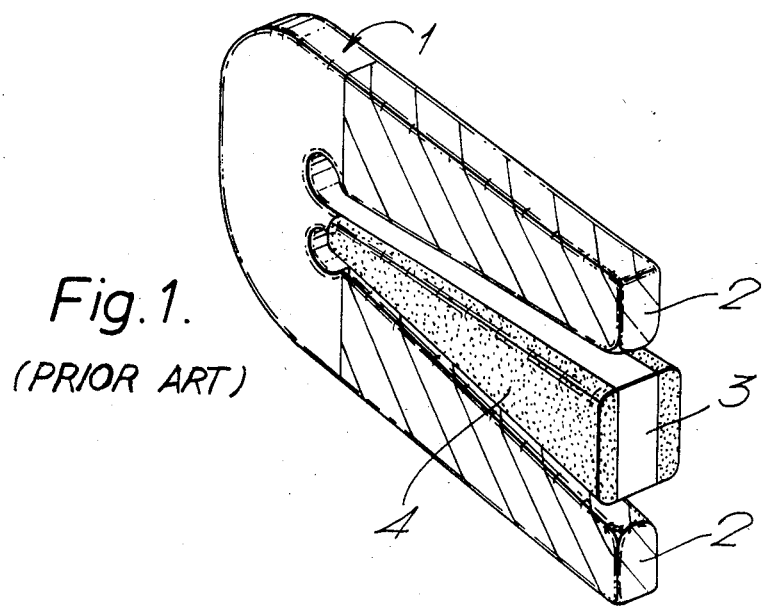
FIGS. 1 and 2 show the use of a known clip for forming a branch-off.
Figure 2:
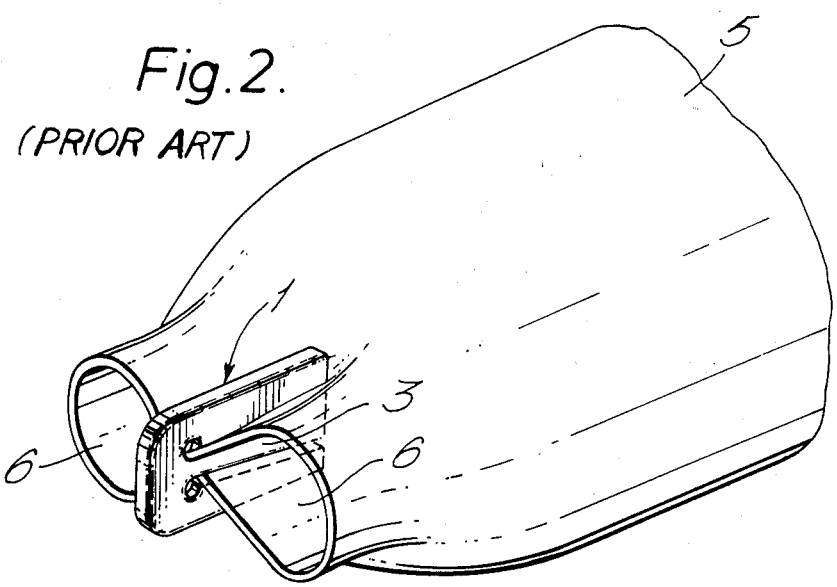

FIGS. 1 and 2 show the type of clip disclosed in U.K. Patent Specification No. 2019120 equivalent to U.S. Pat. No. 4,298,415. The clip 1 has two outer legs 2 and an inner leg 3 coated with a hot melt adhesive 4. The clip 1 is inserted over an end portion of a recoverable sleeve 5 to define two terminal conduits 6. The sleeve 5 maybe used to enclose a cable splice, the cable entering the enclosure through the conduits 6.

Figure 3:
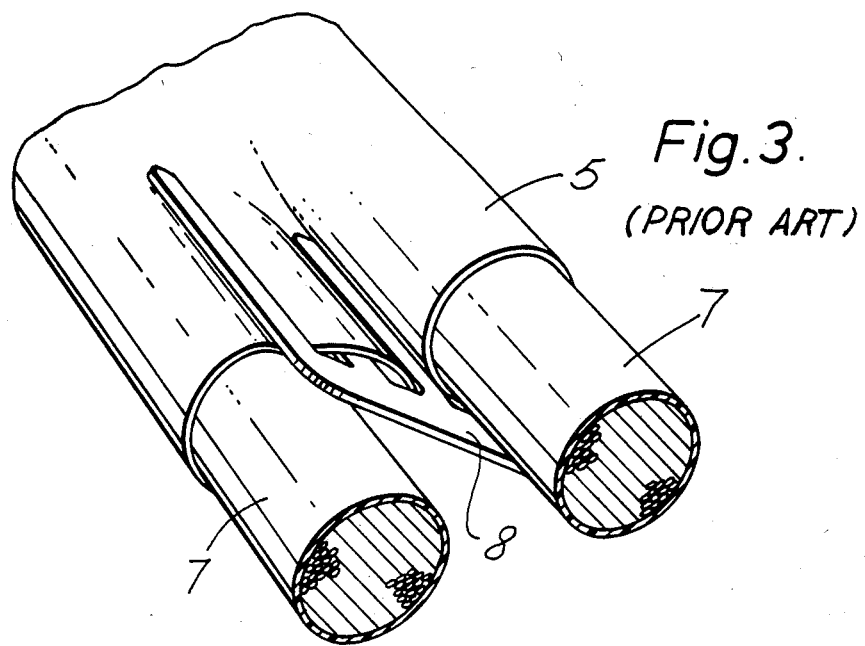
FIG. 3 shows the use of a known fork member for forming a branch-off between two widely spaced substrates.

A different use of a clip is shown in FIG. 3 where a branch-off of two cables 7 is to be enclosed by a recoverable sleeve 5. The cables 7 are spaced rather widely apart, such that use of a simple clip 1 would not produce a proper seal. The clip 1 is not wide enough to hold the two thicknesses of sleeve 5 together throughout the whole of the distance separating the two cables 7, and therefore tent-shaped voids would remain between each cable and the sleeve. The solution, which is disclosed in U.K. patent 1604984 equivalent to U.S. Pat. No. 4,246,687, is to use a fork member 8 which can take up the slack sleeve 5 by threading the sleeve through its prongs.

Figure 4:
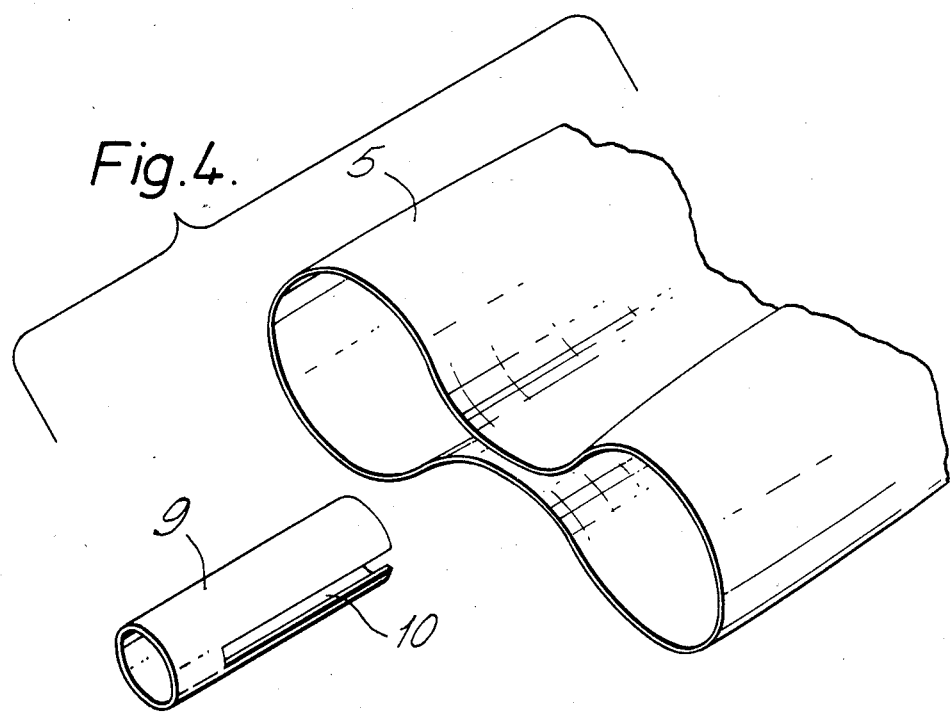
FIGS. 4, 5 and 6 show the new tubular clip forming a branch-off between two substrates.

The inventive design is shown in the remaining figures, the simplest version being shown is FIG. 4. Here, the clip consists of a tubular body of having longitudinal slits 10, one of which is shown, the other being out of view at the back of the clip.

Figure 5:
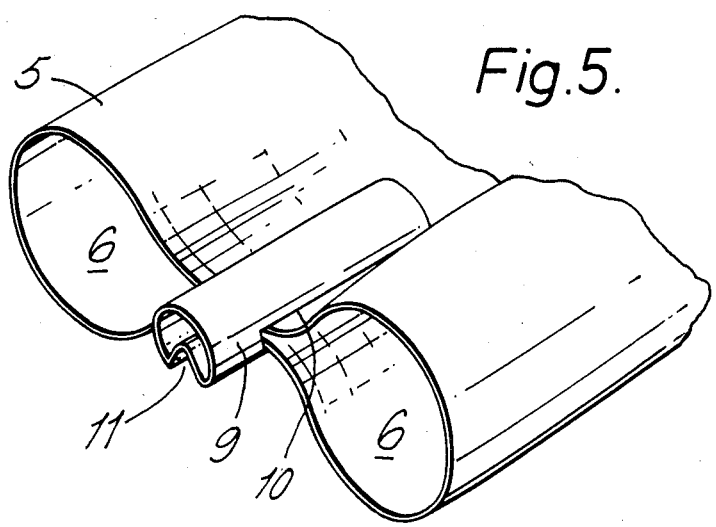

When the clip is slid over an end portion of the sleeve 5, two terminal conduits 6 are defined. This is shown in FIG. 5. FIG. 5 also shows the clip having a re-entrant deformation 11 which is illustrated as running to the rear of the clip, but it need not extend so far. The deformation 11 has two main functions: firstly, it improves heat flow to the crutch region of the branch-off, and secondly it causes the two thicknesses of sleeve 5 within the tubular body to be forced together, thus improving sealing. This second function is better shown in FIG. 6 which depicts a recoverable sleeve 5 around two cables 7, with the clip in position before recovery. It can be seen that the two thicknesses of sleeve enter the tubular body through one of the slits 10 and must rise (as drawn) over the re-entrant deformation 11 before leaving through the other slit 10. Since the line between the two slits is not straight, the two thicknesses of sleeve are forced together when the sleeve tightens during recovery.

Figure 6:
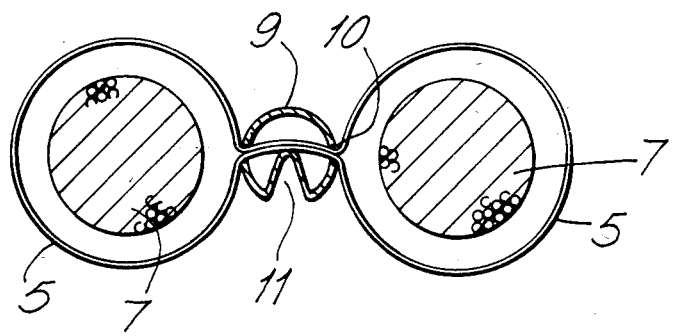

The clips in FIGS. 4-6 are shown to be substantially right cylinders (except for the deformation 11), but other shapes are suitable, for instance the left and right hand sides of the clip as shown in FIG. 6 could be concave, rather than convex, for closer marrying to the cables.

Figure 7:
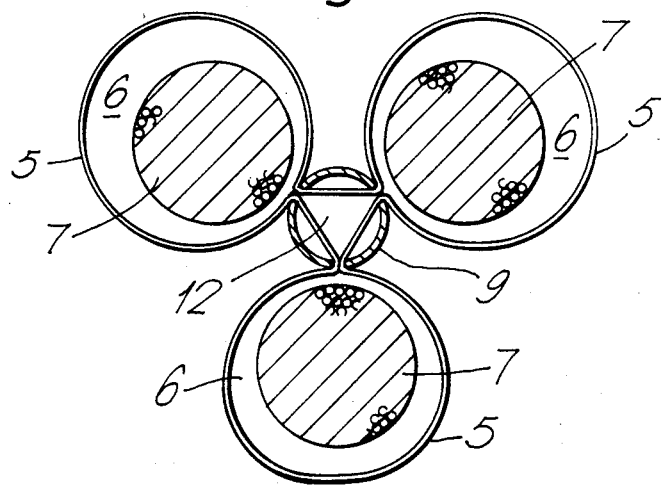
FIG. 7 shows the new clip in a three cable branch-off.

FIG. 7 shows the new tubular clip being used to produce a three cable branch-off. Again, a tubular bodied clip 9 is shown holding a recoverable sleeve 5 about the cables 7, by defining terminal conduits 6. In this case however a void 12 is formed between the thicknesses of sleeve 5 within the tubular body 9. This void 12 provides access to within the enclosure, and, where the function of the enclosure is to provide environmental sealing, the void 12 must clearly be plugged.

One way of plugging the void 12 is shown in FIG. 8, which illustrates a similar arrangement except that four cables 7 are involved and the sleeve 5 is a wraparound sleeve held closed by rails 13 and channel 14. The void is plugged because the end of the tubular body 9 is closed by a screw-threaded cap 15. Instead of a simple cap 15, a valve could be provided.

Alternative ways of sealing the void 15 include providing a hot-melt adhesive within the body 9 of between the cables. Such adhesive could be fed in through an open end of the tube 9 while heating to recover the sleeve.

Figure 10:
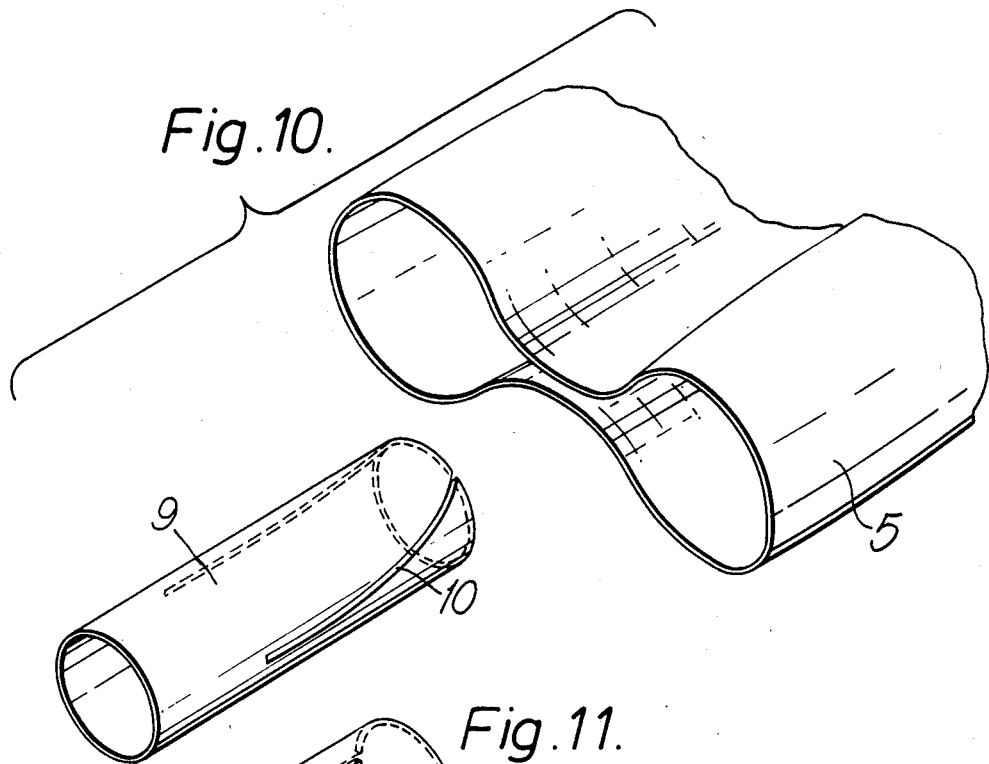
Figure 11:
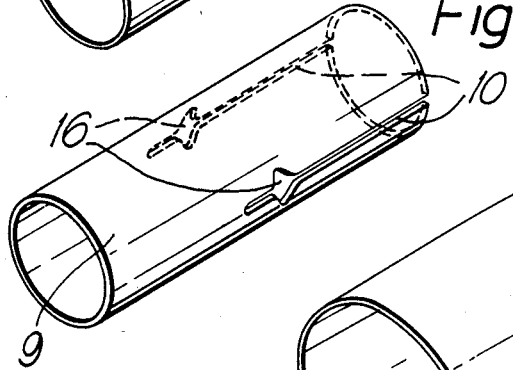
FIG. 11 shows the new clip incorporating an anti-milk-off profile.

FIGS. 9 and 10 illustrate variations in the clip to allow for its use between substrates of various sizes and spacings. In the first of these figures the tubular body is tapered, and in the second the pair of slots converge. In each case, the further the clip is pushed home the greater tightening of the slack sleeve 5 is achieved. Since such designs increase the likelihood of the clip milking-off the sleeve during recovery it is desirable that the slits be shaped to prevent this happening. One type of anti-milk-off profile is illustrated in FIG. 11: the sleeve 5 becomes thicker on recovery and becomes stuck in the widened portion 16, and to ensure that this occurs properly the sleeve should be recovered slightly in the region of the clip first and then recovered generally to cause radial shrinkage.

Figure 12:
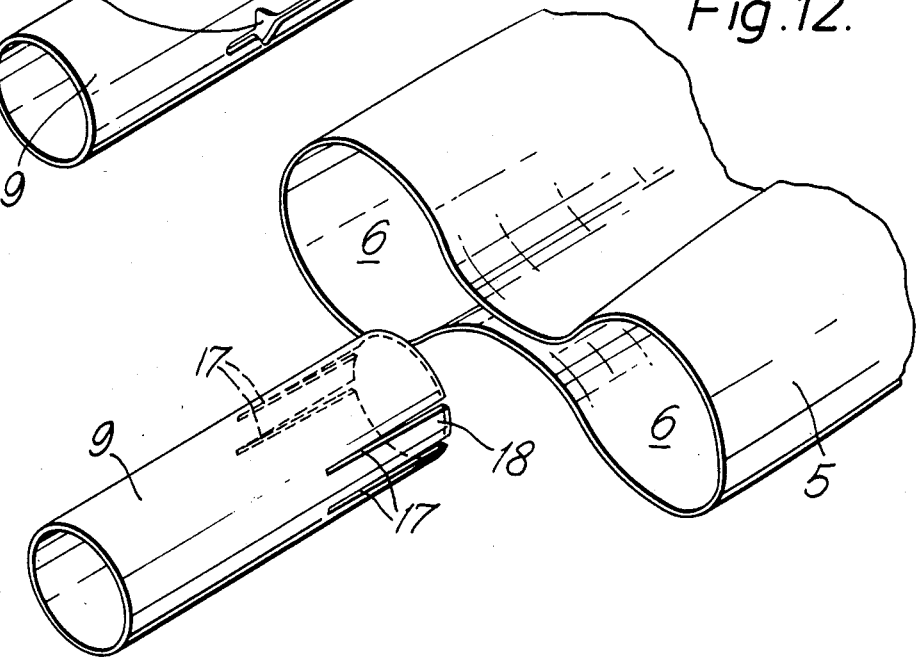
FIG. 12 shows the new clip with pairs of slits, rather than single slits.

In FIG. 12 a clip 9 is shown having two pairs of slits 17 rather than two single slits. Each slit 17 of each pair receives one thickness of an end portion of recoverable sleeve 5, such that the elongate portions 18 project into the sleeve. The size of each slit 17 will substantially correspond to a single thickness of recoverable sleeve, whereas the slits 10 in the earlier drawings substantially corresponded to a double thickness of recoverable sleeve. The elongate portions 18 may provide several advantages. Firstly, introduction of heat within the sleeve to activate an adhesive or sealant can be facilitated by heat conduction along the portions 18. Also, further adhesive or sealant can be supplied within the sleeve by providing an adhesive or sealant coating on the portions 18 or by forming the portions 18 from an adhesive or sealant.

We claim:

1. An enclosure for a branch-off between at least two elongate substrates, which comprises:
    a recoverable sleeve which can surround the branch-off; and
    a clip comprising a tubular body having circumferentially spaced apart at least first and second longitudinal slits or pairs of slits, such that within each slit or pair of slits two thicknesses of an end portion of the sleeve can be received in close fitting engagement to form at least two conduits in the end portion of the sleeve.

2. An enclosure according to claim 1, in which the tubular body has a re-entrant portion which projects through a line joining opposing slits or opposing pairs of slits.

3. An enclosure according to claim 1, in which the tubular body is closed at an end remote from that end which faces the sleeve when in use.

4. An enclosure according to claim 3, in which the tubular body is closed by a removable cap.

5. An enclosure according to claim 1, in which the tubular body tapers towards that end which faces the sleeve when in use.

6. An enclosure according to claim 1, in which the distance between opposing slits or opposing pairs of slits in the tubular body decreases towards that end of the body which faces the sleeve when in use.

7. An enclosure according to claim 1, in which the tubular body contains a heat-activatable adhesive.

8. An enclosure according to any preceding claim, in which the sleeve has a heat-activatable adhesive on its internal surface.

9. An enclosure according to claim 8, in which the heat-activatable adhesive is a hot-melt adhesive.

10. An enclosure according to claim 1, in which the sleeve is a wrap-around sleeve.

11. A splice in a supply line having a branch off enclosed by an enclosure comprising:
    a recoverable sleeve which can surround the branch-off; and
    a clip comprising a tubular body having circumferentially spaced apart at least first and second longitudinal slits or pairs of slits, such that within each slit or pair of slits two thicknesses of an end portion of the sleeve can be received in close fitting engagement to form at least two conduits in the end portion of the sleeve.

12. A splice according to claim 11, in which the supply line is a telecommunications cable.

* * * * *